US007798375B2

(12) United States Patent
Le Maner

(10) Patent No.: US 7,798,375 B2
(45) Date of Patent: Sep. 21, 2010

(54) PUMP FOR DISTRIBUTING A FLUID PRODUCT

(75) Inventor: François Le Maner, La Vallée Montaure (FR)

(73) Assignee: Valois S.A.S., Le Neubourg (FR)

( * ) Notice: Subject to any disclaimer, the term of this patent is extended or adjusted under 35 U.S.C. 154(b) by 825 days.

(21) Appl. No.: 10/578,407

(22) PCT Filed: Nov. 4, 2004

(86) PCT No.: PCT/FR2004/050562

§ 371 (c)(1),
(2), (4) Date: Mar. 19, 2007

(87) PCT Pub. No.: WO2005/044465

PCT Pub. Date: May 19, 2005

(65) Prior Publication Data

US 2007/0272713 A1 Nov. 29, 2007

(30) Foreign Application Priority Data

Nov. 7, 2003 (FR) .................................. 03 13094

(51) Int. Cl.
*G01F 11/00* (2006.01)

(52) U.S. Cl. .................. 222/321.7; 222/321.6; 222/340

(58) Field of Classification Search .............. 222/321.1, 222/321.6, 321.8, 321.2, 321.7, 321.9, 340, 222/341, 372–385; 239/333
See application file for complete search history.

(56) References Cited

U.S. PATENT DOCUMENTS

| | | | | |
|---|---|---|---|---|
| 4,640,443 | A * | 2/1987 | Corsette | 222/321.6 |
| 5,881,925 | A | 3/1999 | Ando | |
| 7,182,226 | B2 * | 2/2007 | Mbonyumuhire | 222/321.2 |
| 2007/0272712 | A1 * | 11/2007 | Pardonge et al. | 222/321.6 |
| 2007/0295756 | A1 * | 12/2007 | Pardonge et al. | 222/321.7 |
| 2009/0255959 | A1 * | 10/2009 | Pruvot | 222/321.6 |

* cited by examiner

*Primary Examiner*—Kevin P Shaver
*Assistant Examiner*—Jonathan Wood
(74) *Attorney, Agent, or Firm*—Sughrue Mion, PLLC

(57) ABSTRACT

A pump for distributing a fluid product is provided. The pump includes: a pump body (10); a pump chamber (20); at least one first piston (72) sliding inside the pump chamber (20) for distributing the fluid product; a distribution orifice (45); an obturator (38) that can be displaced and/or deformed between a closed position of the distribution orifice (45) and an open position of the distribution orifice (45), the chamber including an inlet valve (70) separating the pump chamber (20) from a dip tube (18) extending toward a fluid product reservoir (60); and a bypass passage (74) provided between the dip tube (18) and the pump chamber (20), the bypass passage (74) being placed upstream from the inlet valve (70) and connecting the pump chamber (20) to the dip tube (18) when the pump is primed.

17 Claims, 3 Drawing Sheets

PUMP FOR DISTRIBUTING A FLUID PRODUCT

BACKGROUND OF THE INVENTION

1. Field of the Invention

This invention relates to a fluid product dispensing pump and a fluid product dispensing device comprising such a pump.

2. Description of Related Art

Fluid product dispensing pumps are well known in the state of the art, particularly to dispense products in the cosmetic, perfume and pharmaceutical fields. They usually comprise a piston sliding in a pump body, more particularly in a pump chamber provided in this pump body, and adapted to dispense a dose of the fluid product each time that the pump is activated. The pump chamber usually comprises an inlet valve to define the product dose expelled each time that the pump is actuated. Furthermore, some pumps sometimes include closers at the dispensing orifice, particularly for pharmaceutical products to prevent any contamination of the product between two operations of the pump.

One problem that arises with this type of pump relates to priming. The first time that the pump is actuated, the pump chamber is full of air and therefore this air has to be entirely expelled so that the said pump chamber can be filled with the fluid product to enable precise and reproducible dispensing each time that the pump is actuated. Priming is made more complicated if the pump is provided with a closer. It is difficult to expel air contained in the pump chamber outside the chamber, particularly due to the presence of the said closer.

Another problem that can arise with fluid product dispensing pumps relates to the quality of the spray in the case of a spraying pump. In particular, when a closer is provided at the dispensing orifice, the quality and characteristics of the spray at the time that it is expelled depend on the said closer. Most of these closers are moved under the pressure of the product created during actuation, therefore actuations with different axial intensities or forces can change the spray characteristics. In particular in pumps in which the closer moves in the axial direction away from the dispensing orifice when the pump is actuated, an excessive displacement of the said closer can cause a loss of the spray quality and consequently bad dispensing of the dose.

BRIEF SUMMARY OF CERTAIN EMBODIMENTS OF THE INVENTION

The purpose of the invention is to provide a fluid product dispensing pump that does not have the above-mentioned disadvantages.

More particularly, the purpose of this invention is to provide a fluid product dispensing pump capable of safe and reliable priming in a simple and inexpensive manner.

Another purpose of this invention is to provide a fluid product dispensing pump that guarantees a spray every time that the pump is actuated independently of the force applied on it by the user when activating it.

Another purpose of the invention is to provide a fluid product dispensing pump that is both simple and inexpensive to make and to assemble.

Therefore, the purpose of this invention is a fluid product dispensing pump comprising a pump body, a pump chamber, at least a first piston sliding in the said pump chamber to dispense the fluid product, a dispensing orifice and a closer displaceable and/or deformable between a closing position of the dispensing orifice and an open position of the dispensing orifice, the said pump chamber comprising an inlet valve separating the pump chamber from a dip tube extending to a reservoir of the fluid product, a bypass passage being provided between the said dip tube and the said pump chamber, the said bypass passage being arranged upstream of the said inlet valve, the said bypass passage connecting the pump chamber to the dip tube when the pump is primed.

Advantageously, the pump body is made in a single piece with the said closer.

Advantageously, the inlet valve comprises a valve seat fixed to the first piston and a valve element, the said first piston sliding in a leak tight manner in the said pump body, the said pump body comprising an opening cooperating with the first piston at the time of priming to open the said bypass passage and to enable air contained in the pump chamber to escape through the dip tube in the reservoir before the pump is actuated for the first time.

Advantageously, the said pump comprises a dispensing head incorporating the said dispensing orifice.

Advantageously, the said closer comprises a second piston cooperating in a leak tight manner with the head in any position, and a third piston that can be moved with respect to the said head between a sealed closing position and an open position, the said third piston separating the dispensing chamber into two parts, the first part of the dispensing chamber arranged between the closer and the said third piston and a second part of the dispensing chamber arranged between the said third piston and the said second piston.

Advantageously, the said second part of the pump chamber is connected to the said bypass passage.

Advantageously during actuation, when the third piston moves to its open position in which it connects the said first and second parts of the pump chamber, a part of the product contained in the said pump chamber may be discharged through the said bypass passage into the dip tube and into the reservoir.

Advantageously, the said second part of the pump chamber is connected to the said bypass passage through a passage provided between the said second and third pistons.

Advantageously, the said second and third pistons are made in a single piece.

Advantageously, the said second piston is made in a single piece with the said closer.

Advantageously, the said closer is elastically loaded particularly by a spring, towards its closing position and it is displaced and/or deformed towards its open position by pressure of the product contained in the pump chamber.

Advantageously, the closer moves and/or deforms in the axial direction with respect to the said pump body, the said third piston being moved into the open position from a predetermined axial displacement and/or deformation of the said closer.

Advantageously, the valve element is a ball.

Advantageously, a single spring tends to move the said first piston towards its rest position and the said closer towards its closed position.

Advantageously, the said spring is not in contact with the fluid product.

Advantageously, the said first piston and the said valve seat are made in a single piece with an attachment element such as a snap fittable, crimpable or screwable ring adapted to fix the said pump onto a fluid product reservoir.

Another purpose of this invention is a fluid product dispensing device comprising a fluid product reservoir and a pump as described above.

BRIEF DESCRIPTION OF THE DRAWINGS

Other characteristics and advantages of this invention will become clear after reading the following detailed description of the invention with reference to the attached drawings, given as non-limitative examples and in which.

DETAILED DESCRIPTION OF EXEMPLARY EMBODIMENTS OF THE INVENTION

Figure 1:
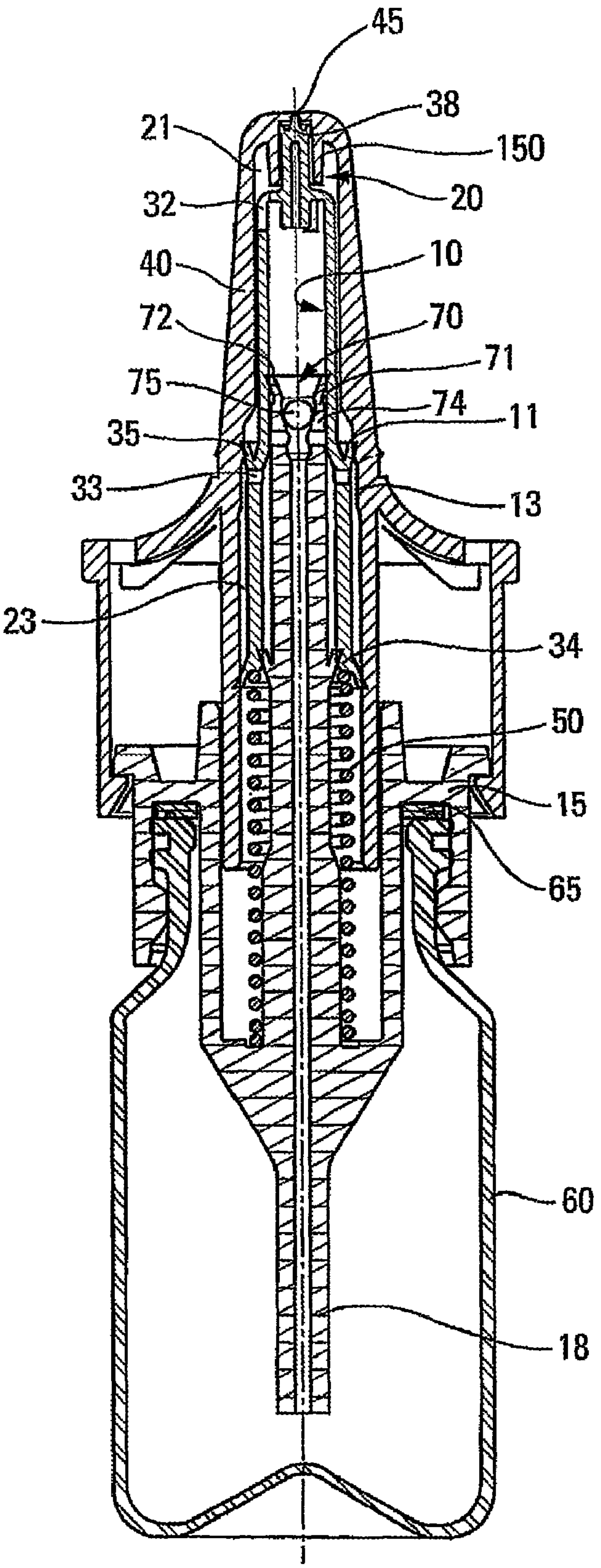
FIG. 1 shows a diagrammatic cross-sectional view of a fluid product dispensing device comprising a pump according to one advantageous embodiment of this invention, in the rest position.

With reference to the Figures, the dispensing pump according to the invention comprises a pump body 10 in which a first piston 72 is free to slide. This first piston 72 partly defines a pump chamber 20 and actuation of the pump dispenses a product dose contained in the pump chamber 20 through a dispensing orifice 45, preferably formed in a dispensing head 40. The pump comprises a closer 38 arranged directly upstream of the dispensing orifice 45, and cooperating with it by being displaceable and/or deformable between a closed position of the dispensing orifice 45 and an open position of this dispensing orifice. The pump chamber comprises an inlet valve 70 that can be made in the form of a ball 75 forming a valve element and cooperating with a valve seat 71. The pump body 10 is preferably formed in a single piece with the closer 38 inside the body. Advantageously, the piston 72 and the valve seat 71 are fixed to a part that includes an attachment ring 15 adapted to fix the pump on a reservoir 60 containing the fluid product, advantageously with provision of a seal 65. A dip tube 18, designed to extend as far as the bottom of the reservoir 60 to dispense the entire product contained in it, may also be made in a single piece with the said part forming the attachment ring 15, piston 72 and the valve seat 71. The valve element 75 is shown in the form of a ball, but it could be made differently.

Figure 2:
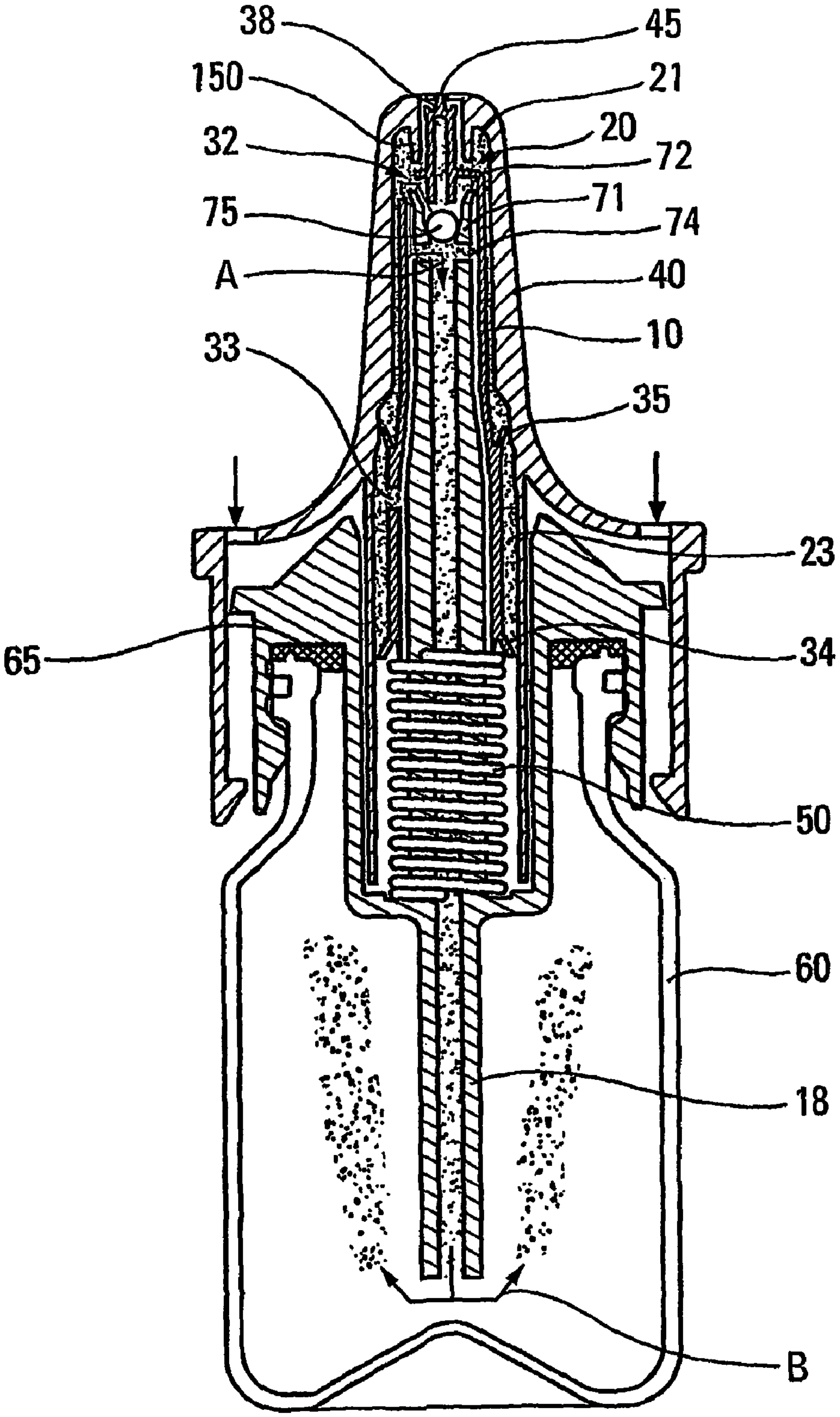
FIG. 2 shows a diagrammatic cross-sectional view of a fluid product dispensing device comprising a fluid product dispensing pump according to one advantageous embodiment of this invention, in the priming position.

A bypass passage 74 is provided between the dip tube 18 and the pump chamber 20 upstream of the inlet valve 70. This bypass passage 74 connects the pump chamber 20 to the dip tube 18 when the pump is primed. In particular, this bypass passage 74 may be made in the form of a lateral hole formed in the valve seat 71 upstream of the valve element 75. The valve seat 71 is then advantageously arranged upstream of the first leaktight piston 72 that slides inside the said pump body, the pump body being provided with an opening 32 that will cooperate with the said first piston 72 during priming. This priming position is shown particularly in FIG. 2. It is found that when the user actuates the pump for the first time, and if there is any air in the pump chamber 20, the air is compressed which closes the inlet valve 70 by pressing the ball 75 in contact with the valve seat 71, since air is compressible, the first piston 72 can slide in the pump body 10 without the closer 38 moving with respect to the dispensing head 40. When the first piston 72 reaches the opening 32 of the pump body 10, a passage is created between the pump chamber 20 and the bypass passage 74, which expels air contained in the pump chamber 20 towards the dip tube 18 and therefore into the reservoir 60 as shown by arrows A and B in FIG. 2. After priming, when the pump returns to its rest position, fluid product is drawn inside the pump chamber 20 and subsequently the first piston 72 can no longer reach the said opening 32 in the pump body 10 during normal operation of the pump, in other words when product is being dispensed, but only at the end of the actuation. The said inlet valve 70 then operates in the conventional manner and closes during actuation and opens when the pump returns to its rest position.

Advantageously, the pump only comprises a single spring 50 adapted to bring the first piston 72 back towards its rest position and the closer 38 towards its closing position after each actuation. This spring 50 is advantageously out of any contact with the fluid product, which eliminates all risks of deterioration of the fluid product in question. Advantageously, the closer 38 slides in the axial direction between its open and closed positions in a sleeve 150 provided inside the actuation head 40. A spraying profile (not shown) is preferably formed in the said sleeve to enable the product to be made turbulent at the time that it is expelled, to form a spray.

To obtain a good quality spray, it is important that the closer 38 should not move too far away from the dispensing orifice 45. In order to eliminate this risk, for example when the user presses on the actuation head 40 too violently, the pump is provided with means of reducing this pressure in the pump chamber 20 when actuation takes place to enable the closer 38 to remain at a sufficiently small distance from the dispensing orifice 45 to make a good quality spray. These means include second and third pistons 34, 35, preferably made in a single piece with the said closer 40. The said second piston 34 slides in the head 40 in a sealed manner between a leak tight closing position and an open position. This third piston 35 separates the pump chamber 20 into a first part 21 of the pump chamber, arranged directly upstream of the dispensing orifice 45 and a second part 23 of the pump chamber located between the said second piston 34 and the said third piston 35. The said third piston 35 slides in the parts 11, 13 of the head 40 that may have different diameters. Thus in the sealed closed position, the third piston 35 may cooperate with a part 11 of the head with a smaller diameter extended by a part 13 of the head with a larger diameter. When the third piston 35 reaches this second part 13 of the head with a larger diameter, the passage between the first part 21 of the pump chamber and the second part 23 of the pump chamber opens up. As a variant, the head part 11 may comprise one or several vent grooves to open the passage between the two parts 21, 23 of the pump chamber using a predetermined position of the said third piston 31.

Figure 3:
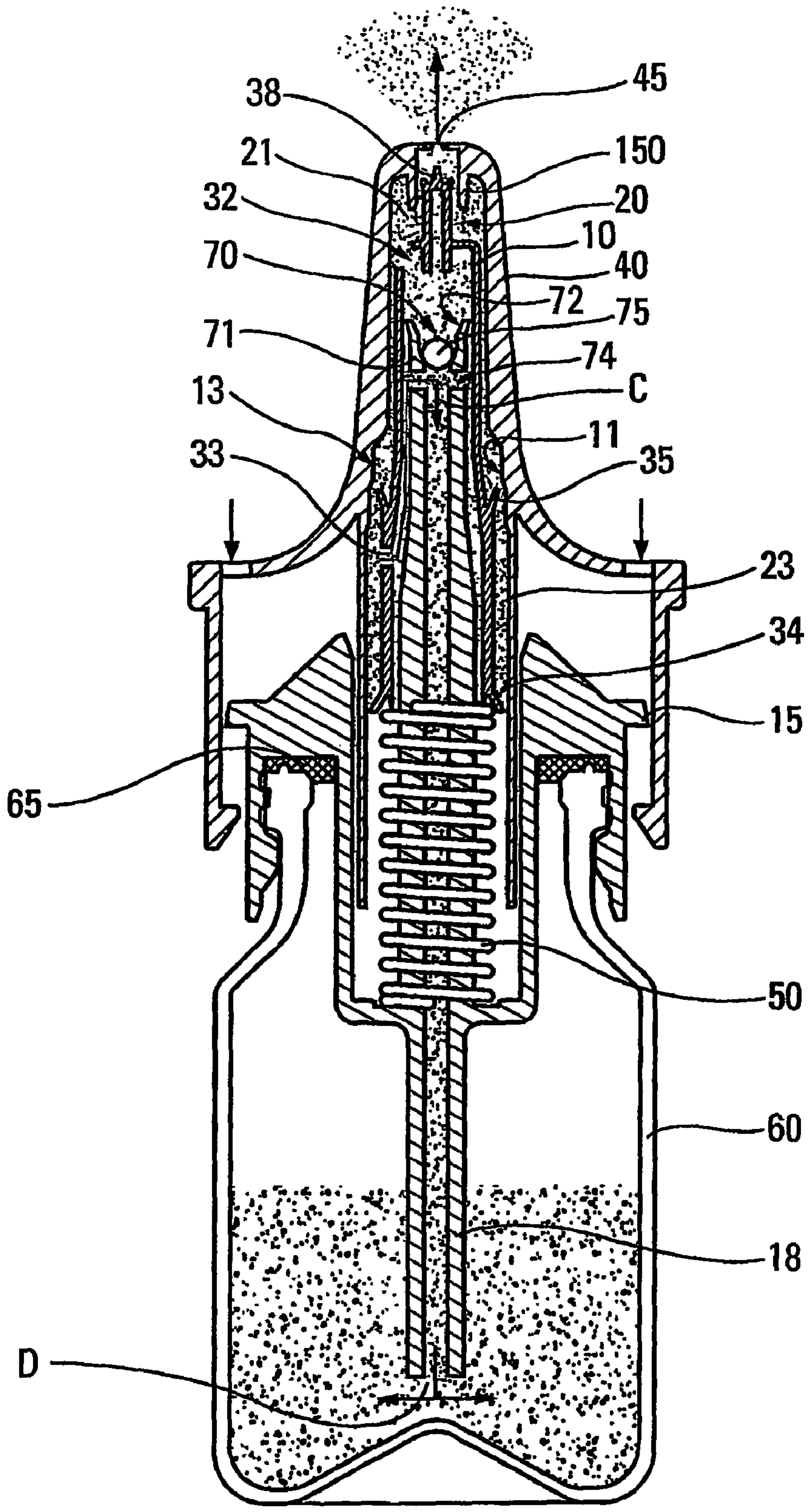
FIG. 3 shows a view similar to FIG. 2, in a position during actuation.

Advantageously, a passage 33 is provided between the said second and third pistons 34, 35 at the said second part 23 of the pump chamber, the said passage 33 being connected to the bypass passage 74 and consequently to the dip tube 18 and to the reservoir 60. When the user presses the actuation head 40 too violently, the pressure in the pump chamber 20 increases very quickly and this pressure quickly displaces the closer 38 to move it away from the dispensing orifice 45. Since the third piston 35 is fixed to the closer 38, it moves at the same time as the closer. After a predetermined axial displacement of the said closer 38, the said third piston 35 reaches its open position such that the over pressure created in the first part 21 of the pump chamber is transmitted to the said second part 23 of the pump chamber. This over pressure then discharges part of the dose through the passage 33 towards the bypass passage 74 and therefore towards the reservoir 60 as shown by the arrows C and D in FIG. 3. Thus, the spray quality is guaranteed by preventing the closer 38 from moving too far away from the dispensing orifice 45.

The bypass passage 74 provided upstream of the inlet valve 70 of the pump chamber 20 thus performs two functions, firstly it acts as an air discharge passage at the time of priming, and secondly it forms a passage through which the product can be discharged during some actuations, to guarantee good spraying of the product.

The invention has been described with reference to a particular embodiment of it, but it is obvious that various modifications could be made to it. In particular the dip tube 18 is not necessarily fixed or is not necessarily made in a single piece with the attachment element 15 that fixes the pump on the reservoir 60. Similarly, the shape of the closer 38, the pump body 10, the piston 72, the inlet valve 70 of the pump chamber 20 or other elements could also be made differently if necessary. Other modifications could also be considered by those skilled in the art without going outside the scope of this invention as defined by the attached claims.

The invention claimed is:

1. Fluid product dispensing pump comprising:

a pump body (10);

a pump chamber (20);

at least a first piston (72) sliding in the said pump chamber (20) to dispense the fluid product;

a dispensing orifice (45); and a closer (38) displaceable or deformable between a closing position of the dispensing orifice (45) and an open position of the dispensing orifice (45), wherein said pump chamber (20) comprises an inlet valve (70) separating the pump chamber (20) from a dip tube (18) extending to a reservoir (60) of fluid product, said inlet valve (70) comprising an inlet valve seat (71), and a bypass passage (74) being provided between the said dip tube (18) and the said pump chamber (20), the said bypass passage (74) being arranged upstream of the said inlet valve (70), the said bypass passage (74) being a lateral hole formed in said inlet valve seat (71), and the said bypass passage connecting the pump chamber (20) to the dip tube (18) when the pump is primed.

2. Pump according to claim 1, in which the pump body (10) is made in a single piece with the said closer (38).

3. Pump according to claim 1, in which the inlet valve (70) comprises the inlet valve seat (71) fixed to the first piston (72) and a valve element (75), the said first piston (72) sliding in a leak tight manner in the said pump body (10), the said pump body (10) comprising an opening (32) cooperating with the first piston (72) at the time of priming to open the said bypass passage (74) and to enable air contained in the pump chamber (20) to escape through the dip tube (18) in the reservoir (60) before the pump is actuated for the first time.

4. Pump according to claim 1, in which the said pump comprises a dispensing head (40) incorporating the said dispensing orifice (45).

5. Pump according to claim 4, in which the said closer (38) comprises a second piston (34) cooperating in a leak tight manner with the head (40) in any position, and a third piston (35) that can be moved with respect to the said head (40) between a sealed closing position and an open position, the said third piston (35) separating the dispensing chamber (20) into two parts, a first part (21) of the dispensing chamber arranged between the closer (38) and the said third piston (35) and a second part (23) of the dispensing chamber arranged between the said third piston (35) and the said second piston (34).

6. Pump according to claim 5, in which the said second part (23) of the pump chamber (20) is connected to the said bypass passage (74).

7. Pump according to claim 6, in which when the third piston (35) moves to its open position during actuation in which it connects the said first and second parts (21, 23) of the pump chamber (20), a part of the product contained in the said pump chamber (20) may be discharged through the said bypass passage (74) into the dip tube (18) and into the reservoir (60).

8. Pump according to claim 6, in which the second part (23) of the pump chamber (20) is connected to the said bypass passage (74) through a passage (33) provided between the said second and third pistons (34, 35).

9. Pump according to claim 5, in which the said second and third pistons (34, 35) are made in a single piece.

10. Pump according to claim 5, in which the said second piston (34) is made in a single piece with the said closer (38).

11. Pump according to claim 5, in which the said closer (38) is elastically loaded by a spring (50), towards its closing position and said closer (38) is displaced towards its open position by pressure of the product contained in the pump chamber (20).

12. Pump according to claim 11, in which the closer (38) moves or deforms in the axial direction with respect to the said pump body (10), the said third piston (35) being moved into the open position from a predetermined axial displacement or deformation of the said closer (38).

13. Pump according to claim 3, in which the valve element (75) is a ball.

14. Pump according to claim 1, in which a single spring (50) tends to move the said first piston (72) towards its rest position and the said closer (38) towards its closed position.

15. Pump according to claim 14, in which the said spring (50) is not in contact with the fluid product.

16. Pump according to claim 1, in which the said first piston (72) and the said inlet valve seat (71) are made in a single piece with an attachment element (15) such as a snap fittable, crimpable or screwable ring adapted to fix the said pump onto a fluid product reservoir (60).

17. Fluid product dispensing device comprising a fluid product reservoir (60), characterised in that it comprises a pump according to claim 1.

* * * * *